March 10, 1942.   B. T. McCORMICK   2,276,057
SPLIT PHASE MOTOR
Filed July 24, 1940
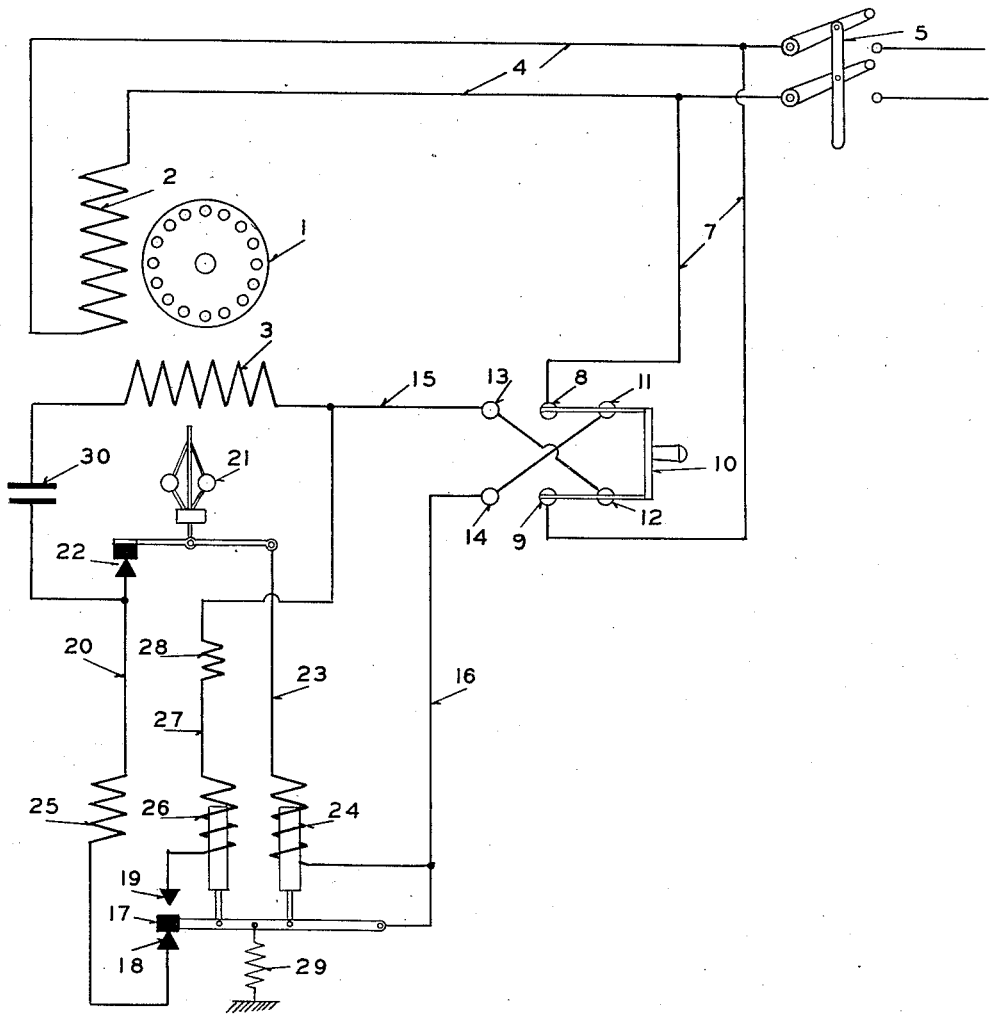
INVENTOR
B. T. MCCORMICK
BY
ATTORNEY Patented Mar. 10, 1942

2,276,057

UNITED STATES PATENT OFFICE 2,276,057

SPLIT-PHASE MOTOR

Bradley T. McCormick, St. Louis, Mo., assignor to Wagner Electric Corporation, St. Louis, Mo., a corporation of Delaware Application July 24, 1940, Serial No. 347,130

6 Claims. (Cl. 172—279)

My invention relates to split phase motors and more particularly to means för reversing single phase motors. It is common practice in single phase squirrel cage induction motors to start the machine by the use of a so-called split phase. The split phase, also called auxiliary winding, is displaced from the main winding and the electrical conditions of the split phase circuit are so selected as to produce during starting a current flow through this winding which is a phase displaced from the current flow in the main winding. After the machine has reached full speed, or nearly full speed, the split phase winding is usually disconnected, thus allowing the machine to operate in the main winding only. This disconnection is frequently performed by a centrifugal switch which opens the circuit of the split phase winding when the rotor of the machine has reached a predetermined speed. If the machine starts from zero speed, the direction of the starting torque depends on the sequence in which the split phase winding is connected parallel with the main winding. The direction of rotation of the machine is readily reversed if the machine is allowed to come to, or nearly to, a standstill before the reversal is attempted. Under such conditions the circuit through the auxiliary winding is completed by the centrifugally-operated switch. If such reversal of rotation is attempted while the machine is in operation, it will be found impossible because the split phase winding is disconnected from the main winding so that the reversal of this circuit has no effect on the direction of rotation.

It is the object of my invention to provide means for reversing a split phase motor even if it is operated at full speed. I accomplish this by using an auxiliary switch which is connected in parallel with the centrifugal switch. When the machine is started from rest, the auxiliary switch instantly opens and the starting current feeding the auxiliary winding flows through the contacts operated by the centrifugal mechanism. When the predetermined speed is reached, the centrifugal switch opens and disconnects the auxiliary winding from the main winding. If it is desired to reverse the machine at full speed, the auxiliary switch automatically resumes its initial position in parallel with the centrifugally-operated switch. This establishes a circuit between the main winding and the auxiliary winding at the instant that the reversing switch is thrown. At the same time the connection between the main and auxiliary windings is reversed. Current flows through the auxiliary winding in reverse direction and consequently reverses the torque of the machine. This results in the reduction of the speed to or near zero at which time the centrifugally-operated switch closes. This automatically opens the auxiliary switch, allowing the machine to accelerate in the opposite direction of rotation. When approximately full speed is reached, the circuit of the auxiliary winding is again opened by the centrifugal switch.

Specific means for carrying out my invention are illustrated in the accompanying drawing which is a diagrammatic view of a single phase split phase motor.

The numeral 1 indicates the squirrel cage armature of the machine which is provided with a main stator winding 2 and an auxiliary stator winding 3. Current is supplied to the main winding by line wires 4 and is controlled by a starting switch 5. A circuit 7 shunted around the winding 2 is connected to terminals 8 and 9 of a reversing switch 10. These terminals may be connected by the switch either to contacts 11—12 or contacts 13—14. Contact 13 is connected by conductor 15 with one end of winding 3 and with contact 12. Contact 14 is connected by a conductor 16 with the contact 11 and with the auxiliary duplex switch 17 which may engage with either of two contacts 18 or 19. Contact 18 is connected by a conductor 20 with winding 3. The centrifugal mechanism 21, usually mounted on the rotor shaft, operates a switch 22. This switch is connected by a conductor 23 with the conductor 16 and includes a solenoid 24 for actuating switch 17. An impedance 25 having the same impedance value as the solenoid 24 is included in the conductor 20. In addition to solenoid 24, I provide a holding coil 26 which is included in a conductor 27 extending between conductor 15 and contact 19. The current flowing through coil 26 should be just sufficient to hold the switch 17 against contact 19. A resistance 28 may be connected in the conductor 27 if the coil 26 does not have sufficiently high resistance to secure the desired result. A spring 29 biases switch 17 toward contact 18. In the drawing I have shown a condenser 30 in series with winding 3 for splitting the phase. Other known expedients may, however, be used to secure this result.

The operation of my machine is as follows: With the parts in the position shown when the starting switch 5 is closed, the main winding 2 is excited and current for the split phase winding 3 is supplied from the shunt circuit 7 through the following connections: terminal 9, reversing switch arm, contact 12 and conductor 15 to one end of the winding. The return circuit from the other end of the winding is through conductor 20, switch 22, conductor 23, including solenoid 24, and conductor 16, contact 11, and reversing switch arm, to terminal 8. There is also a branch circuit through conductor 20, contact 18, and switch arm 17 to conductor 16 and thence to terminal 8. The impedance value of 25 is equal to that of solenoid 24, therefore half of the current flowing through the auxiliary winding passes through the solenoid 24, thus moving the auxiliary switch to open contacts 17—18 and close contacts 17—19. This closes the circuit through conductor 27 including holding coil 26 which will hold switch 17 against the action of spring 29. Switch 22 will remain closed until sufficient speed is attained to operate the centrifugal device 21.

If it is desired to reverse the machine when it is at full speed, the switch 10 is moved into position to connect terminal 8 with contact 13 and terminal 9 with contact 14. During this movement of the reversing switch, the current through the holding coil 26 is momentarily disrupted so that the spring 29 moves the auxiliary switch to close contacts 17—18. As soon as the movement of the reversing coil is completed, current can flow in the auxiliary winding as contacts 17 and 18 are closed and switch 22 is open so that solenoid 24 is not energized. The direction of the flow of current through the winding will, however, be reversed. The motor will, therefore, develop a torque in the opposite direction and come to a standstill. When a sufficiently slow speed is reached, the centrifugal device 21 permits switch 22 to close. As soon as this occurs, current flows through solenoid 24 opening contacts 17—18. The current in the auxiliary winding now only flows through switch 22, the switch 17 being retained in position to open contacts 17—18 by the holding coil 26 which is energized when contacts 17—19 are closed. The machine now speeds up in the reverse direction until the centrifugal device 21 opens switch 22 to cut out the auxiliary winding when the machine will be in normal but reverse operation.

Having fully described my invention, what I claim as new and desire to secure by Letters Patent of the United States is:

1. In a split phase motor, a rotor, a main winding, an auxiliary winding, means for reversing the current in the auxiliary winding relative to the main winding, a speed responsive switch for opening the auxiliary winding circuit, an auxiliary switch closing a circuit in parallel with the speed responsive switch, means for opening said auxiliary switch when the speed responsive switch is closed, and holding means for retaining said auxiliary switch in its open position after the speed responsive switch is opened, said holding means being releasable by movement of the current reversing means before the stoppage of the motor.

2. In a split phase motor, a rotor, a main winding, an auxiliary winding, means for reversing the current in the auxiliary winding relative to the main winding, a speed responsive switch for opening the auxiliary winding circuit, a duplex auxiliary switch closing a circuit parallel with the speed responsive switch when in one position, means for opening said circuit by movement of the auxiliary switch when the speed responsive switch is closed, and holding means for retaining said auxiliary switch in the other position after the speed responsive switch is opened, said holding means being actuated by the movement of the auxiliary switch to its second named position.

3. In a split phase motor, a rotor, a main winding, an auxiliary winding, means for reversing the current in the auxiliary winding relative to the main winding, a speed responsive switch for opening the auxiliary winding circuit, a duplex auxiliary switch closing a circuit parallel with the speed responsive switch when in one position, means for opening said circuit by movement of the auxiliary switch when the speed responsive switch is closed, and holding means for retaining said auxiliary switch in the other position after the speed responsive switch is opened, said holding means being actuated by the movement of the auxiliary switch to its second named position, said reversing means operating to release the holding means.

4. In a split phase motor, a main winding, an auxiliary winding, a reversing switch for changing the direction of current in the auxiliary winding relative to the main winding circuit, a speed-responsive switch in the auxiliary winding circuit, an auxiliary switch in parallel with the speed responsive switch, a solenoid for actuating the auxiliary switch, said solenoid being energized by closing of the speed responsive switch, and a holding coil for retaining the auxiliary switch in open position, the movement of the reversing switch from one position to another interrupting the current through the holding coil to release the auxiliary switch.

5. In a split phase motor, a main winding, an auxiliary winding, a reversing switch for changing the direction of current in the auxiliary winding relative to the main winding circuit, a speed responsive switch in the auxiliary winding circuit, said auxiliary winding circuit having two branches one of which is controlled by the speed responsive switch, a duplex auxiliary switch controlling the other branch of said circuit, a solenoid in said first named branch for actuating the auxiliary switch, a shunt circuit controlled by the auxiliary switch, and a holding coil in said shunt circuit for retaining the auxiliary switch in position to hold the second named branch open after the solenoid is de-energized due to the opening of the first named branch by the speed responsive switch.

6. In a split phase motor, a main winding, an auxiliary winding, a reversing switch for changing the direction of current in the auxiliary winding relative to the main winding circuit, a speed responsive switch in the auxiliary winding circuit, said auxiliary winding circuit having two branches one of which is controlled by the speed responsive switch, a duplex auxiliary switch controlling the other branch of said circuit, a solenoid in said first named branch for actuating the auxiliary switch, an impedance in said second named branch to electrically balance said solenoid, a shunt circuit controlled by the auxiliary switch, and a holding coil in said shunt circuit for retaining the auxiliary switch in position to hold the second named branch open after the solenoid is de-energized due to the opening of the first named branch by the speed responsive switch, the reversing switch operating to de-energize the holding coil.

BRADLEY T. McCORMICK.